United States Patent [19]

Kemper

[11] 4,036,273

[45] July 19, 1977

[54] TRACTION AUGMENTING ROAD GRIPS

[76] Inventor: Kenneth E. Kemper, 2905 Cable Road, Anaconda, Mont. 59711

[21] Appl. No.: 587,271

[22] Filed: June 16, 1975

[51] Int. Cl.² .................. B60C 27/00; B60C 27/10
[52] U.S. Cl. .................. 152/225 R; 152/190; 152/217; 152/221; 152/222
[58] Field of Search ................ 152/225–230, 152/216–219, 178, 179, 185–187, 190, 191, 301, 221, 222

[56] References Cited

U.S. PATENT DOCUMENTS

| | | | |
|---|---|---|---|
| 1,287,512 | 12/1918 | Swanson | 152/225 |
| 2,290,398 | 7/1942 | Wellington | 152/226 |
| 2,423,759 | 7/1947 | Edwards | 152/225 |
| 2,540,230 | 2/1951 | Andrews | 152/218 |
| 2,936,016 | 5/1960 | Stack | 152/217 |
| 3,117,613 | 1/1964 | Michnoff | 152/228 |
| 3,506,051 | 4/1970 | Mathews | 152/216 |
| 3,856,068 | 12/1974 | Callaghan et al. | 152/190 |

*Primary Examiner*—Drayton E. Hoffman
*Attorney, Agent, or Firm*—John E. Reilly

[57] ABSTRACT

Traction augmenting ribs are formed of a semi-rigid material particularly well-suited for placement around a vehicle tire or the like. Each rib is formed of a pair of side arms and an interconnecting central portion which are arranged in a generally U-shaped configuration to fit around the vehicle tire. The side arms are formed of a bow-like spring arrangement which is flexible in response to application of forces at the ends thereof in a radially inward direction relative to the tire so that the side arm ends are positioned to displace the rigid interconnecting elements beyond the contour of the tire. Interconnecting linkages or cables are passed through the rib ends and are tightened in a circumferential direction so as to apply the radially inward force to the rib side arms. Reinforcing steel wires can be included throughout the length of each rib and reinforcing crossbars can be embedded within the central portion of each rib so as to facilitate accommodation of tires of varying tread widths. Inclusion of an easily attached cable take-up arrangement between the ends of the circumferential linkage permits attachment of the assembly to tires of differing circumferences. Studs can be embedded in the central portion of the ribs.

9 Claims, 10 Drawing Figures

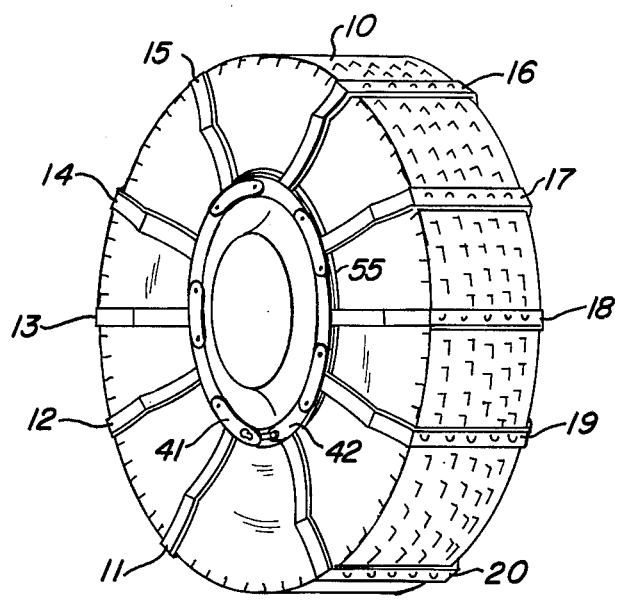
Fig_1
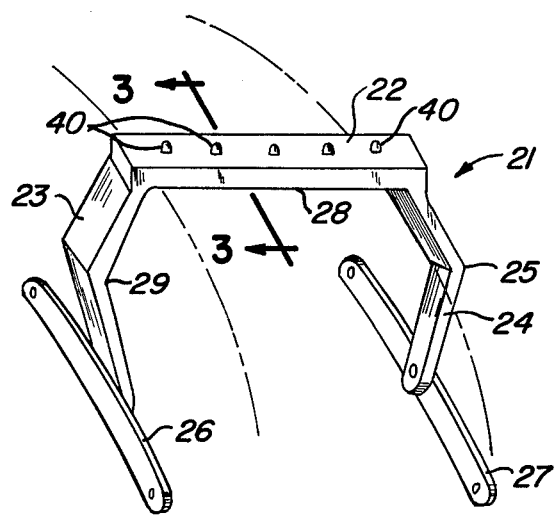
Fig_2
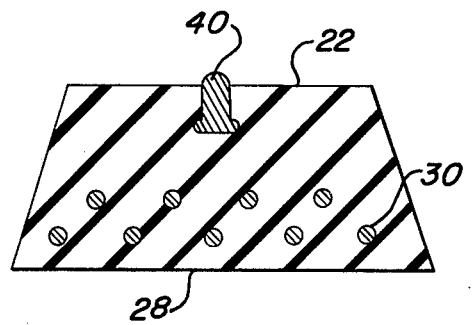
Fig_3

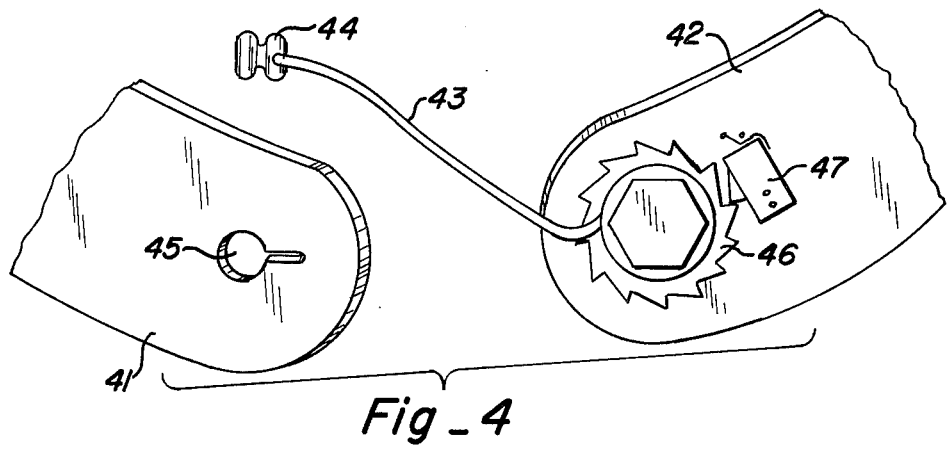
Fig_4
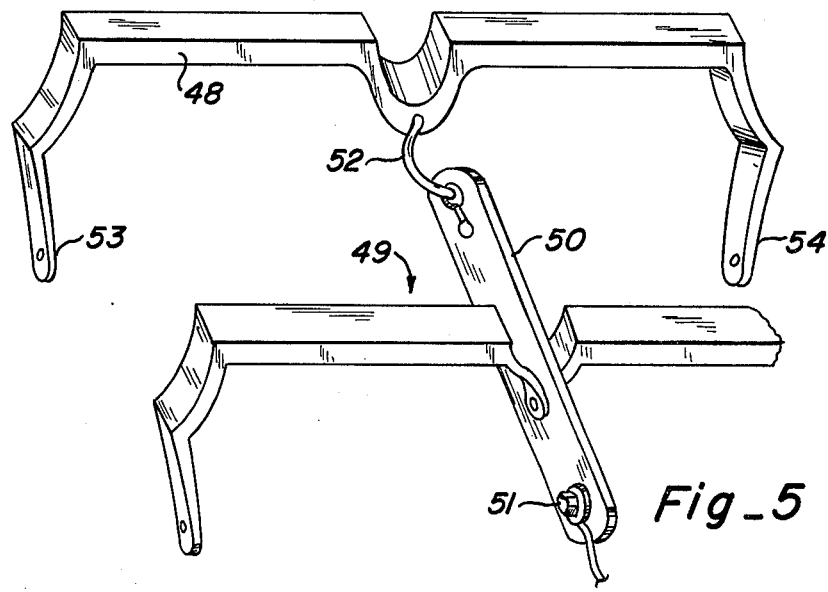
Fig_5
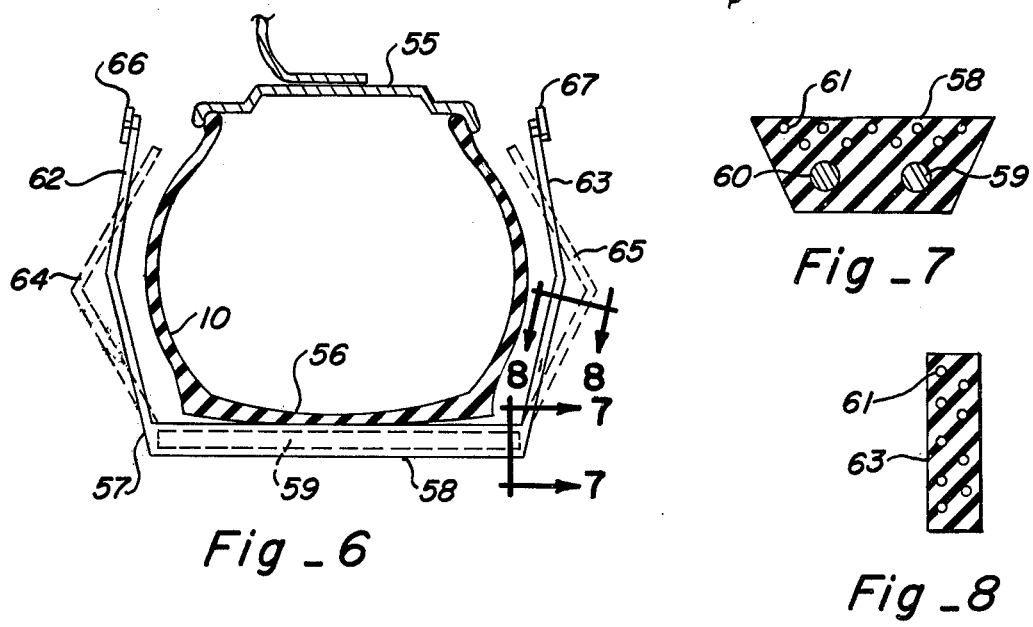
Fig_6
Fig_7
Fig_8

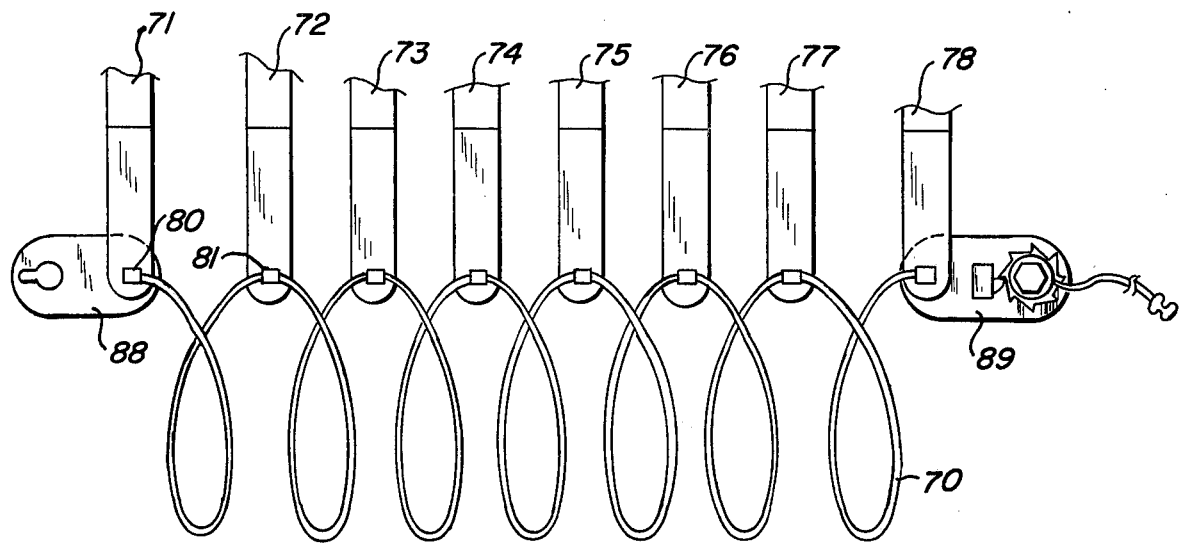
Fig_10
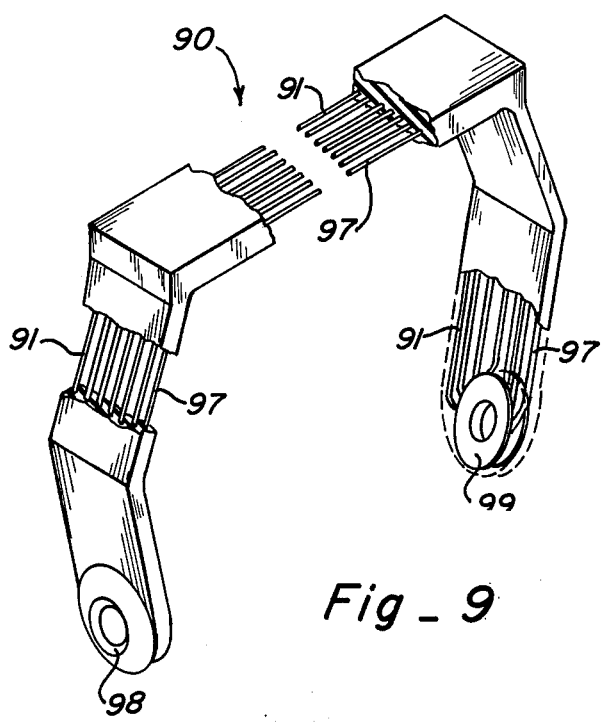
Fig_9

TRACTION AUGMENTING ROAD GRIPS

BACKGROUND OF THE INVENTION

The present invention relates to apparatus and methods for removably attaching temporary traction augmenting devices to a vehicle tire or the like. More particularly, the present invention relates to apparatus and methods for temporarily enhancing the traction qualities of a vehicle tire by providing an assembly which can be removably attached to the tire so as to increase its traction relative to a surface whose friction characteristics have been reduced for various reasons. The present invention is especially useful for increasing the traction of a vehicle tire in mud, snow or even on icy surfaces.

It has been long recognized that the configurations of automobile tire treads which are suitable for use on relatively dry surfaces are not suitable when employed in relatively low friction environments such as when operated over snow, mud or ice. The most popular response to the traction augmenting problem has been through the various configurations of generally loose chains which are attached and tightened around the tire rim. Such chains are awkward to attach to the vehicle because of their pliant nature which also makes them difficult to maintain in a relatively tight-fitting configuration around the tire. Still further, such chains are frequently required for only short periods and are thereafter driven over clear road surfaces. Under such conditions, the chains tend to break after relatively short periods thus rendering them unsuitable for further use.

It has also been suggested that rigid lugs be attached around the tire circumference to provide the traction augmenting results. Examples of such rigid lugs are shown in U.S. Pat. Nos. 1,283,729 by Ginley, 1,867,773 by Spidla et al, 2,696,237 by Doughty, 2,423,759 by Edwards and 2,936,016 by Stack. The rigid lugs of such devices are interconnected by chains, serially coupled linkages, take-up cables with releasable ratchet arrangements and the like. However, because of the relatively inflexible nature of such rigid lugs and the necessary positioning of the interconnecting linkages, such devices tend to produce undesirable wear or even damage to the vehicle tire under conditions of under-inflation or even from normal tire flexure during usage.

Tire manufacturers have approached the traction augmenting problem by tailoring special tread configurations such as in the so-called snow tire arrangement and further have embedded studs or other traction augmenting elements within the tire to assist it in frictionally engaging icy surfaces. Although a sometimes acceptable compromise between tire chains or rigid lugs and standard tire tread traction, such snow or stud tires are relatively expensive, frequently tend to wear rapidly and suffer other disadvantages such as noise and road surface destruction.

Accordingly, efforts have been directed towards providing a detachable temporary traction augmenting arrangement for tires which can somewhat simulate the presence of snow or stud tires. For instance, U.S. Pat. No. 3,506,051 by Mathews shows an arrangement for effectively covering an existing tire with tire casement sections having snow treads and reinforcing bars. Another arrangement for providing somewhat flexible temporary crossbars which can include studs embedded therein is shown in U.S. Pat. No. 2,540,230 by Andrews. Both devices require relatively complex attaching arrangements and further require acceptance of the hazard of sidewall damages from the positioning of the relatively rigid attaching apparatus.

SUMMARY OF THE INVENTION

The present invention contemplates advantageous utilization of U-shaped ribs formed from semi-rigid material such as the same materials from which vehicle tires are constructed. These ribs have two side arms attached to each end of a central crossbar section with the cross-bar section having a width equal to or greater than the face of the tire tread. The side arms extend in a spring-like bow configuration outwardly from the vehicle side walls. Further, the side arms are dimensioned for flexibly responding to a radially inward force applied to the ends thereof so that the side arms will be positioned sufficiently beyond the bulge of the tire contour so that any rigid interconnecting elements will be clear of the tire sidewalls. This flexibility of the spring-like side arms and the dimensioning insures that the tire will now be damaged in the event of partial or complete deflation nor will any sidewall wear or damage result from normal flexure of the sidewalls during usage. The ends of these ribs are adapted to be interconnected by a serial linkage arrangement, cable loop or the like with the interconnecting apparatus being completed over a gap by a slack take-up arrangement. A quickly detachable cable arrangement with a ratche and pawl spooling configuration permits circumferentially shortening the interconnecting linkage or loop so as to result in the radially inward pressure on the ends of the rib side arms.

Reinforcing wires can be embedded completely within the ribs to relieve the semi-rigid encasing material of the tensile stress and road-engaging studs can further be embedded in the crossbar section of the ribs. An additional strengthening rod can be embedded within the crossbar or central section of the ribs to further accommodate attachment to tires having differing road-engaging tread widths. An assembly of a multiplicity of these ribs with the interconnecting arrangement is relatively easy to handle and attach to a tire while still providing a tire contour following but tightly fitting configuration which does not expose the tire to potential damage or unintended wear from tire flexure or under-inflation.

An object of this invention is to provide a traction augmenting rib useful for vehicle tires or the like.

A further object is to provide a traction augmenting device that fits a tire tightly and does not loosen from usage.

A still further object is to provide a traction augmenting device that will flex with the action of the tire to which it is attached.

An additional object is to provide a traction augmenting device that conforms to the shape of the tire to which it is attached thereby speeding and simplifying the process of application and removal from the tire.

Another object of this invention is to provide traction augmenting apparatus which can be easily attached to or removed from a vehicle tire or the like but which cannot damage the tire under any condition including low air pressure or complete deflation.

Still another object of this invention is to provide a traction augmenting rib for vehicle tires wherein the rib will follow the flexure of the tire during usage and will not hazard undue wear or damage to the tire from its flexure.

Yet another object of this invention is to provide a tire traction augmenting assembly which is relatively easy to attach but which can produce enhanced tire traction qualities for slippery or low-friction tire usage environments.

A still further object of this invention is to provide a tire augmenting assembly which can be easily adapted to tires of varying circumferences and/or surface-engaging tread widths.

Other objects, advantages, features and applications of the present invention will become more apparent in light of the following description of a preferred embodiment taken in conjunction with the accompanying drawings:

BRIEF DESCRIPTION OF THE DRAWINGS

FIG. 1 is a perspective view of a vehicle tire having traction augmenting ribs attached thereto.

FIG. 2 is a perspective view of one traction augmenting rib as attached to interconnecting links for use in the FIG. 1 embodiment.

FIG. 2 is a cross-sectional view of the central portion of a rib in accordance with FIGS. 1 and 2.

FIG. 4 illustrates a cable take-up arrangement employing a ratchet and pawl useful in conjunction with the present invention.

FIG. 5 shows a modification of the present invention to accommodate dual wheel assemblies of a vehicle.

FIG. 6 shows a cross-sectional view of a traction augmenting rib as applied to a vehicle tire particularly showing an additional arrangement for accommodating varying tire tread widths and the flexing action of the side arms.

FIG. 7 is a sectional view taken along lines 7—7 of FIG. 6.

FIG. 8 is a sectional view of a side arm taken along lines 8—8 of FIG. 6.

FIG. 9 is a partially broken perspective view of a rib showing one arrangement for looping reinforcing wires around an attaching eyelet; and FIG. 10 shows an alternate arrangement for interconnecting rib side arms via a cable.

DETAILED DESCRIPTION OF THE PREFERRED EMBODIMENT

FIG. 1 illustrates one embodiment of the present invention applied to a pneumatic tire 10 in the form of an interconnected assemblage of ribs 11-20. As will be appreciated from the more detailed description below, ribs 11-20 each fit tightly around the contour of tire 10 and are easier to attach to the tire than loosely connected chains. Further, ribs 11-20 are adaptable to a wide variety of surfaces particularly useful for winter road usage or even in a mud or sand environment. These advantages stem at least in part from the solid construction of the device and the configuration of the traction ribs which permits their centering on tire 10 automatically. Further, by interconnecting the ribs by a linkage arrangement or an attached cable, the assembly can be installed on tire 10 without the inconvenience associated with slack as in loose chains.

A typical rib 21 useful in the assemblage shown in FIG. 1 is depicted in greater detail in FIG. 2. Rib 21 is formed of a central crossbar portion 22 which has side arms 23 and 24 extending from the ends thereof in a generally U-shaped cofiguration. Each side arm is formed in a bowed spring arrangement such as via an arcuate bend at 25 or 29 and the outer ends of each arm 23 and 24 are attached to link sections 26 and 27. The attachment of arms 23 and 24 to links 26 and 27 can be either rigid or pivotal. The links of all ribs in an assembly as shown in FIG. 1 are interconnected by a fastening system which stretches the spring sections such as 25 and 29 in each traction rib 11-20 so that the central crossbar portion 22 will fit tightly across the face of the tread of tire 10.

FIG. 3 illustrates a typical cross-section along lines 3—3 of FIG. 2. Crossbar 22 is preferably formed of rubber or other typical materials employed in fabricating vehicle tires and thus insures its adaptability to paved road surfaces while reducing the possibility of its breakage from use on hard clear pavements as is hazarded with chains. Although the ribs can be formed entirely of rubber or equivalent materials, FIG. 3 illustrates the embedded reinforcing steel wires such as 30 which can extend completely through center section 22 as well as continuing to the ends of the side arms 23 and 24. This relieves the rib rubber base of the major tensile stresses while not detracting from the road surface engaging qualities of the encasing materials. FIG. 3 also illustrates the embedding of a stud 40 for increased ice traction if this should be desired.

Accordingly, traction ribs such as 21 are U-shaped assemblies of rubber and steel which fit with the inside surface 28 of the central portion 22 flush against the tread of tire 10. The side arms 23 and 24 are interconnected via serially coupled linkages such as 26 and 27 which are hinge connected at their ends to the next link for the next rib. Although linkages are shown in the FIG. 1 assembly with ribs attached to each, it will be readily understood that additional interconnecting links without attached ribs can be included in the serial chain. As mentioned, the core of each rib is preferably reinforced by steel wires such as 30 encased within a rubber or other suitable material. The side arms such as 23 and 24 including the reinforcing wires coaxially extending therethrough are configured or bent to form a bow-spring arrangement which deflect to hold the rib against the tire tread in response to the application of a radially inward force to the ends of side arms 23 and 24 as developed by the circumferential linkages. It should be noted that the bow spring configurations 25 and 29 also serve to change the direction of pressure caused by the weight of the car rolling over the rib. The outside center of the U-shape is the surface which contacts the road and may include studs or fine wires as are used in airplane tires for protrusions from the rib surface for better ice traction.

The rib assembly is adjustable to fit tires with the same wheel size but different outside circumferences. These differences are accommodated by the pivotal attachment of the interconnected linkages such as 26 and 27 and by allowing a space between the end links 41 and 42. As illustrated in FIG. 4, end links 41 and 42 are bridged by a steel cable 43 which has a catch 44 attached to one end for fitting through key slot 45. The other end of cable 43 is attached to a take-up ratchet spool 46 which coacts with releasable pawl 47. There are a variety of releasable take-up devices available similar to that shown for ratchet 46 and pawl 47 and thus the details of this structure will not be described further. The amount of space between end links 41 and 42 when properly tightened and worn on a smaller tire will result in a relatively small spacing between links 41 and 42 and thus a relatively small circumferential span of the total interconnected serial linkage arrangement.

Conversely, when the assembly is attached to a larger tire, the spacing between end links 41 and 42 and the circumference of the interconnected linkages will be greater. It should be understood that interconnecting linkages for the reverse side of the ribs 11–20 in FIG. 1 are preferably provided by an arrangement similar to that shown in FIG. 1.

FIG. 5 shows an adaptation of the present invention for use on dual tires as are employed in heavy duty trucks and the like. In this arrangement, double rib sections such as 48 and 49 are employed although their fabrication and cross-section may be essentially the same as that described previously for FIGS. 1–3. In this example, rib 48 is of the same general configuration as a typical intermediate rib although both ribs 48 and 49 are shown adapted for use as end ribs. 49 is a typical end rib which includes a bar 50 which has a take-up spool or ratchet assembly 51 at one end for connection to the complementary end rib 48 via cable 52 which has a catch on the end thereof for mating with the key-like slot on the end of bar 50 in a manner somewhat similar to that described above. The intermediate ribs such as 48 are interconnected by a cable which could be a continuous cable somewhat like that shown in FIG. 10 terminating at one end at a ratchet assembly 51 and at the other end with cable 52. It should be understood that the outer ends of the ribs such as 53 and 54 would be interconnected by additional linkages such as that described previously for FIG. 1.

The shortening of the circumference of the interconnecting linkages as by applying a wrench or the like to the ratchet assembly 46 shown in FIG. 4 produces the radially inward forces at the ends of each rib side arm. A protective cover can be included to prevent dirt, ice or the like from fouling the operation of the ratchet 46 and pawl 47 if desired. The dimensional sizes of the ribs and interconnecting linkages are a matter of choice for the range of tires intended to be accommodated. Thus, although ten ribs 11–20 are shown in FIG. 1, any number can be included and the spacing between end links 41 and 42 can be arranged to accommodate a variety of tire sizes. It is generally believed that a gap of 0° to 25° between end links 41 and 42 will be satisfactory for a majority of the vehicle tire sizes available. The use of linkages such as 26 and 27 shown in FIG. 2 and as are also illustrated in FIG. 1 can permit folding back upon itself of the ribs so that they can be sequentially applied around the tire 10 in place. The attachment of the ribs to the crossbars can be arranged in a slightly off-center configuration if desired to augment this attachment procedure.

As shown in FIG. 10, the chain of linkages illustrated in FIG. 1 can be replaced with a cable loop 70 with the ends of the rib side arms 71–78 attached thereto which will further facilitate the application of the assembly to a tire. The means of attaching ribs 71–78 to cable 70 such as at 80 and 81 can be either a permanent clamp or a releasable clamp which accommodates repositioning of the ribs along cable 70 or even removal or addition of such ribs. The end links 88 and 89 with their attendant slack cable and ratchet/pawl assembly are essentially as described above. The use of a circumferential cable 70 not only facilitates application of the rib assembly to a tire but further reduces the storage space required when not in use.

The semi-rigid nature of the materials used to fabricate the ribs removes the difficulty in applying the ribs to a tire since the ribs readily conform to the tire shape. Further, the tightening of the ribs via the interconnecting linkages results in a relatively tight fit across the tread of tire 10 in a manner which will not tend to loosen during usage and further, because of the spring-like and flexible nature of the ribs, will tend to follow the tire contour during usage. By arranging the dimensions of the rib side arms so as to extend the ends thereof beyond the bulge of the tire contour as is best seen in FIG. 6, the loss of air pressure in the tire will not increase the hazard of rib breakage and further will not expose the tire sidewalls to injury from any of the more rigid elements associated with the assembly. Thus the present invention permits the location of all rigid materials inn a more harmless location adjacent to the wheel whereas the semi-rigid material of the rib adjacent to the tire behaves more like the material of the tire itself when under stress.

The steel reinforcing wires such as 30 shown in FIG. 3 can be wrapped around spool-like devices for attachment to the links or loop cable or can be welded to washers or the like at the tips of the side arms. One example of this is shown in FIG. 8 wherein rib 90 has a plurality of reinforcing wires 91–97 which are embedded throughout the length of the side arms and central crossbar of rib 90. These wires 91–97 are looped around or otherwise attached to eyelets 98 and 99 which can then be attached to a circumferentially interconnecting cable or serial linkage assembly as described previously. If desired, reinforcing wires 91–97 can actually be a single wire looped back and forth between eyelets 98 and 99 with the ends suitably attached together and/or to the eyelets.

The present invention can be further adapted to accommodate tires of differing tread widths as is shown in FIG. 6. In FIG. 6, tire 10 which is mounted to rim 55 is of a relatively narrow tread width 56. The rib 57 has a central portion 58 with a pair of cross-bars 59 and 60 which are shown in the cross-sectional view of FIG. 7 taken along lines 7–7 of FIG. 6. Reinforcing bars 59 and 60 are for the purpose of preventing flexure of rib 57 at the edges of tread face 56 thereby accommodating a range of tire tread widths. The inclusion of reinforcing wires such as 61 can be used so as to extend across central portion 58 and coextend through side arms 62 and 63 substantially as described before. The extension of the reinforcing steel wires such as 61 through the side arms is illustrated in section in FIG. 8 which is taken along lines 8—8 of FIG. 6.

FIG. 6 also illustrates the flexing action of side arms 62 and 63. More particularly, the dotted outline of side arms 62 and 63 are shown at 64 and 65 prior to application of the radially inward force to the ends thereof by the interconnecting means. With the application of the radial force via the tightening of the link chain or cable loop, the ends 66 and 67 of side arms 62 and 63 will extend at least into sufficient proximity to the edge of mounting ram 55 as shown so that flexure of the tire during normal usage or as a result of deflation will position the relatively rigid interconnecting elements associated with ends 66 and 67 beyond the rim 55 thereby avoiding any possible injury to the sidewalls of tire 10.

The configuration of the ribs as described with the bow spring side arms markedly facilitates the application of the ribs around a vehicle tire. The undeflected side arms tend to cooperate with the sidewalls of the tire as the ribs are being arrayed around the tire circumference. This temporarily holds the assembly in place until the links or cable loops are tightened. The spring action of the side arms can even be arranged to lightly grip the tire sidewalls during application of the assembly if desired.

While the present invention has been described with particularity relative to the foregoing exemplary preferred embodiments, various other changes, additions, modifications and applications will be readily apparent to those having normal skill in the art without departing from the spirit of this invention.

What is claimed is:

1. A traction augmenting rib removably attachable to a vehicle tire or the like which has a cross-section of a generally flat surface engaging portion and outwardly bulging sidewalls attachably cooperating with a mounting rim comprising an elongated member of semi-rigid flexible material having a central section at least as wide as the surface engaging portion of the tire and a pair of side arms each having one end thereof attached to a respective end of said central section so as to form a generally U-shaped configuration, at least one rigid cross bar embedded within said central section so as to extend throughout the length of said central section, said central section having a generally smooth inner surface for flush interfacing with the surface engaging portion of the tire, said arms being arranged in an outwardly directed spring bow relative to the sidewalls of the tire when the inner surface of said central section is placed against the surface engaging portion of the tire, and means for applying forces to the other ends of said side arms in a direction radially inward relative to the axis of the tire and with sufficient magnitude to at least partially straighten said side arms, each said side arm having sufficient length for responding to said radially inward force so that the said other end thereof is positioned at least in proximity to the edge of the mounting rim, said side arms each being adapted to flexingly follow changes in contour of the tire during movement of the vehicle.

2. A traction augmenting rib in accordance with claim 1 which further includes a pair of link bars attached to respective said other ends of said side arms, said radially inward force applying means being pivotally attached to the ends of said links.

3. A traction augmenting rib in accordance with claim 1 wherein said member is composed of a casing of resilient material with at least one reinforcing wire embedded therein so as to extend longitudinally therethrough from said other end of one of said side arms to the said other end of the other said side arm, said wire being fabricated of material which is laterally flexible but which has a relatively high tensile strength.

4. Apparatus removably attachable for augmenting the traction of a vehicle tire or the like which tire has a cross-section of a generally flat surface engaging portion and outwardly bulging sidewalls attachably cooperating with a mounting rim, comprising:

a plurality of semi-rigid, flexible, elongated ribs each having a central section at least as wide as the surface engaging portion of the tire and each including a pair of side arms having first and second ends, said first end of each of said side arm being attached to a respective end of the associated said central section so as to form a generally U-shaped configuration therewith, each said rib further including a rigid cross bar embedded within said central section so as to extend throughout the length of said central section, said central section having a generally flat, smooth and continuous inner surface for flush interfacing with the surface engaging portion of the tire, said side arms being arranged in an outwardly directed spring bow relative to the sidewalls of the tire when the inner surface of said central section is placed against the surface engaging portion of the tire, a pair of means interconnecting said second ends of said side arms on each side of the tire in a closed loop, and a pair of means each connected to a respective said interconnecting means for selectably shortening the length of the said loops thereof for applying forces to said side arms in a radially inward direction with respect to the rotational axis of the tire, said side arms being dimensioned for responding to said radially inward force by deflecting against the spring bow thereof so that said second end extends at least into proximity to the edge of said mounting rim.

5. Apparatus in accordance with claim 4 wherein each said rib includes at least one reinforcing wire embedded therein and extending longitudinally through the said side arms and said central section thereof.

6. Apparatus in accordance with claim 4 wherein each said interconnecting means includes a plurality of links pivotally coupled at the ends thereof in a serial arrangement, said selectably shortening means associated therewith including a cable releasably attachable to a first said link of said serial arrangement and means attached to the last said link of said serial arrangement for removing slack from said cable when attached to said first link.

7. Apparatus in accordance with claim 6 wherein said slack removing means further includes spool means arranged for having said cable wound thereon, and releasable ratchet means retaining said spool means with said cable wound thereupon.

8. Apparatus in accordance with claim 4 wherein each said interconnecting means includes a cable having said second end of each of said side arm on one side of the tire connected thereto in a serial arrangement, said selectably shortening means associated therewith including means for applying a closure force between said second ends of the first and last of said side arm second ends in said serial arrangement.

9. Apparatus in accordance with claim 8 wherein said selectably shortening means includes a spool for windingly receiving said cable, and releasable ratchet means for retaining said spool in the wound condition.

* * * * *